United States Patent
Pate et al.

(10) Patent No.: US 6,741,603 B2
(45) Date of Patent: May 25, 2004

(54) USE OF A CIRCULAR BUFFER TO ASSURE IN-ORDER DELIVERY OF PACKETS

(75) Inventors: Prayson Will Pate, Durham, NC (US); Michael Joseph Poupard, Youngsville, NC (US)

(73) Assignee: Overture Networks, Inc., Morrisville, NC (US)

( * ) Notice: Subject to any disclaimer, the term of this patent is extended or adjusted under 35 U.S.C. 154(b) by 0 days.

(21) Appl. No.: 10/190,416

(22) Filed: Jul. 3, 2002

(65) Prior Publication Data

US 2003/0026277 A1 Feb. 6, 2003

Related U.S. Application Data

(60) Provisional application No. 60/304,062, filed on Jul. 9, 2001.

(51) Int. Cl.[7] ............................................... H04L 12/28
(52) U.S. Cl. ...................... 370/412; 370/428; 370/394; 370/429
(58) Field of Search ............................. 370/39, 4, 503, 370/412–418, 392, 428, 429, 253, 537, 109, 132, 134, 394, 395, 753, 235, 390, 229, 230; 711/132, 134, 109, 29, 33, 52, 53; 374/12; 710/29, 33, 52, 53

(56) References Cited

U.S. PATENT DOCUMENTS

| | | | |
|---|---|---|---|
| 5,151,899 A | * | 9/1992 | Thomas et al. ............. 370/394 |
| 5,383,189 A | | 1/1995 | Matsuyama et al. |
| 5,541,926 A | | 7/1996 | Saito et al. |
| 5,802,310 A | | 9/1998 | Rajaraman |
| 5,926,475 A | * | 7/1999 | Saldinger et al. ........... 370/394 |
| 5,961,640 A | | 10/1999 | Chambers et al. |
| 6,134,246 A | | 10/2000 | Cai et al. |
| 6,141,324 A | | 10/2000 | Abbott et al. |
| 6,169,748 B1 | | 1/2001 | Barbas et al. |
| 6,233,240 B1 | | 5/2001 | Barbas et al. |
| 6,233,251 B1 | | 5/2001 | Kurobe et al. |
| 6,256,315 B1 | | 7/2001 | Barbas et al. |
| 6,310,898 B1 | * | 10/2001 | Schwartz .................... 370/537 |
| 6,353,874 B1 | | 3/2002 | Morein |
| 6,434,606 B1 | | 8/2002 | Borella et al. |
| 6,452,950 B1 | | 9/2002 | Ohlsson et al. |
| 6,578,105 B2 | | 6/2003 | Finn et al. |
| 2002/0031126 A1 | * | 3/2002 | Crichton et al. ............ 370/394 |

* cited by examiner

Primary Examiner—Kenneth Vanderpuye
Assistant Examiner—Ian N Moore
(74) Attorney, Agent, or Firm—Kevin E. Flynn; Daniels Daniels & Verdonik, P.A.

(57) ABSTRACT

A circular buffer is used to receive packets transmitted to an application. Normally, incoming packets are placed at the "tail" of the buffer, which is indicated by the write pointer. Packets to be used by the application are read from the "head" of the buffer, which is indicated by the read pointer. In contrast, the present invention uses the sequence number to direct the packets to specific places in the circular buffer. This inventive use of sequence number allows the packets to be written at the proper place in the buffer, regardless of the location of the write pointer. Within certain limits, a packet that arrives out of sequence is not bound by the position of the write pointer to be placed into the buffer out of sequence. This abstract is provided as a tool for those searching for patents, and not as a limitation on the scope of the claims.

9 Claims, 10 Drawing Sheets

USE OF A CIRCULAR BUFFER TO ASSURE IN-ORDER DELIVERY OF PACKETS

This application claims priority from now abandoned U.S. Provisional Patent Application No. 60/304,062 filed on Jul. 9, 2001 for Use of A Circular Buffer to Assure In-Order Delivery of Packets.

For the convenience of the reader, various acronyms and other terms used in the field of this invention are defined at the end of the specification in a glossary. Other terms used by the applicant to define the operation of the inventive system are defined throughout the specification. For the convenience of the reader, applicant has added a number of topic headings to make the internal organization of this specification apparent and to facilitate location of certain discussions. These topic headings are merely convenient aids and not limitations on the text found within that particular topic.

In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative component use the same principles. The use of such specificity to provide clarity should not be misconstrued as limiting the scope of the disclosure to the named component unless the limitation is made explicit in the description or the claims that follow.

FIELD OF THE INVENTION

This invention relates to communications systems and methods, in particular, to packet communication systems and methods.

BACKGROUND OF THE INVENTION

Mis-Ordering in Packet Communications Systems

Packet communication systems, or networks, are commonly used for the conveyance of information for data applications. However, packet networks are not perfect. While many systems are insensitive to absolute propagation delay (APD—the time it takes for a packet to propagate through the network), some systems are sensitive to propagation delay variation (PDV—changes in the APD, also known as jitter or wander).

If PDV varies enough from packet to packet, the packets may get re-ordered packets such that packet N, which was sent before packet N+1, arrives after packet N+1. An example of this mis-ordering is shown in FIG. 1.

Figure 1A:
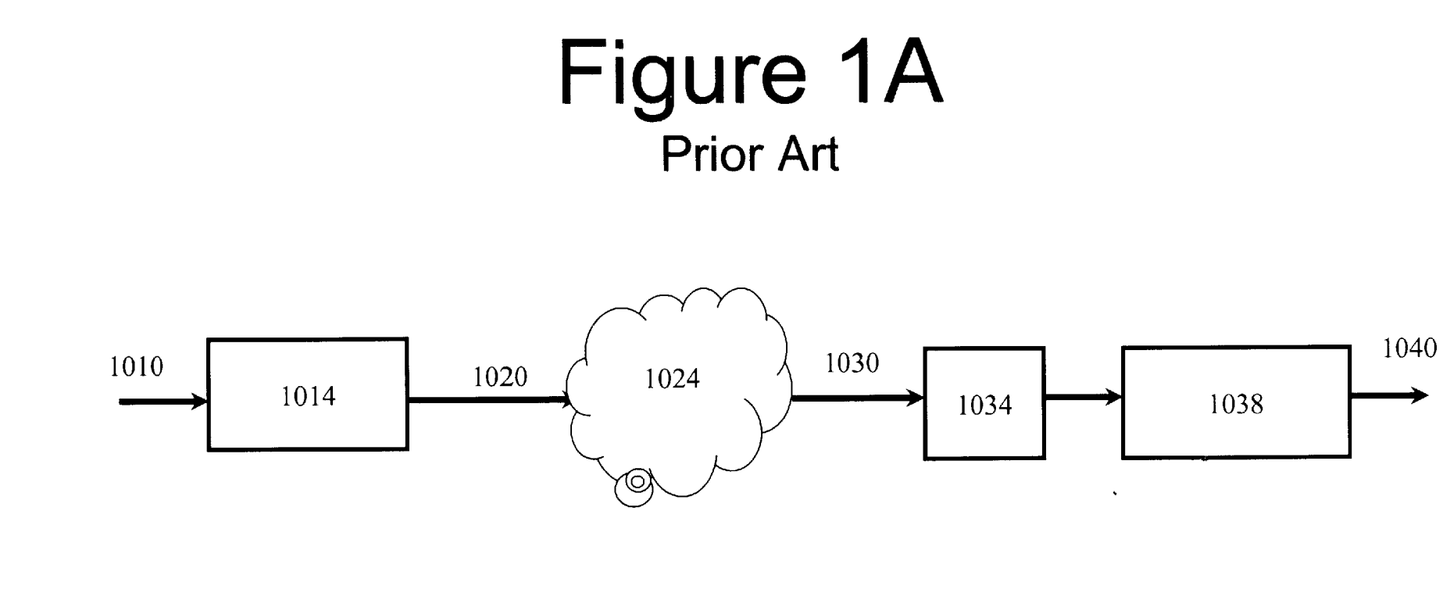
FIG. 1 illustrates the flow path and timing of bits and packets in a network with some variation in PDV.
Figure 1B:
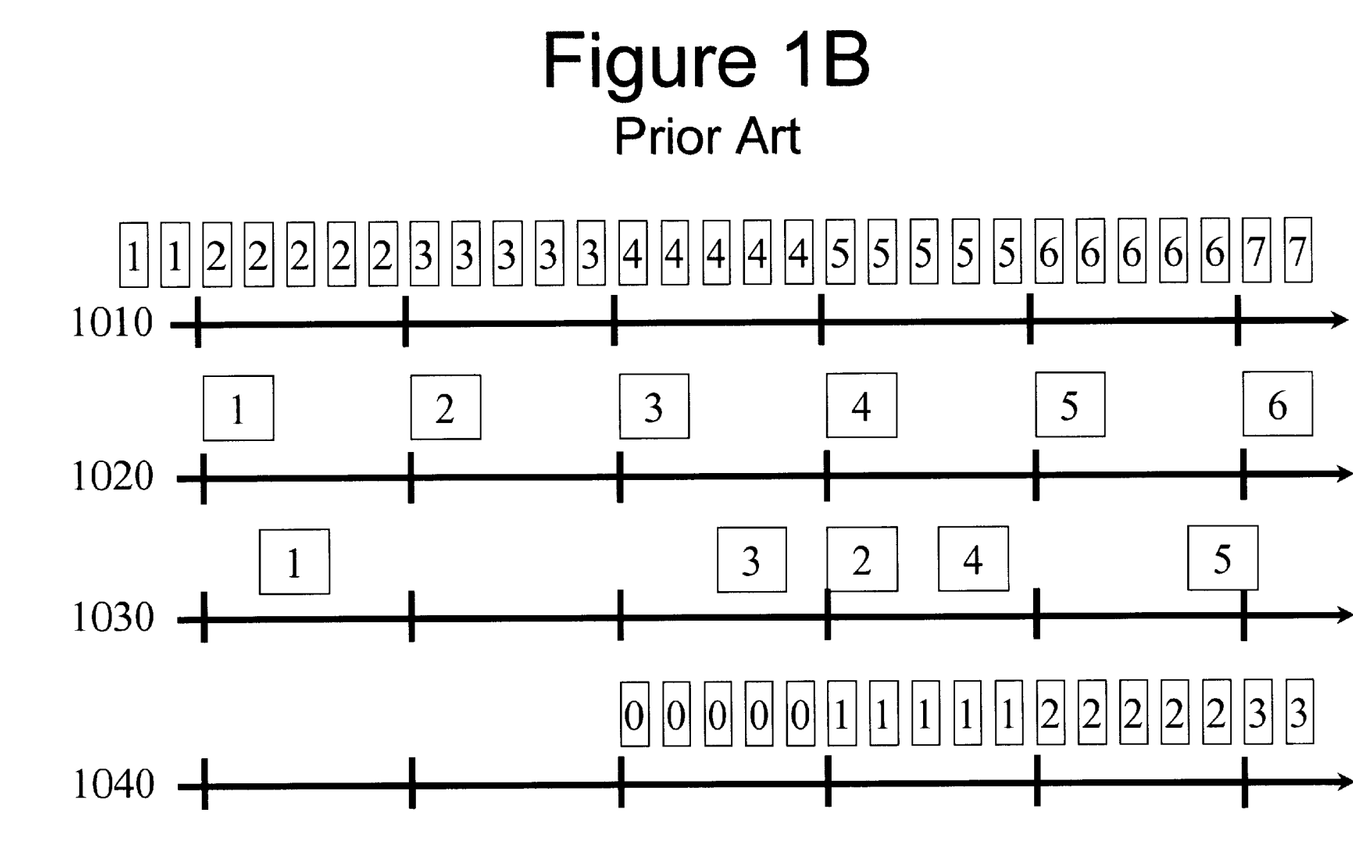

FIG. 1A illustrates the general progression from transmit bits 1010 through encapsulation 1014 to transmit packets 1020 through the packet network 1024 to arriving packets 1030 through the JAB 1034 and de-encapsulation 1038 to become a stream of receive bits 1040. Consider a CBR (Constant Bit Rate) application where the bits are created at constant rate R. The rate R remains constant because there are no pauses in the data stream. The application at the receiving end is typically set to receive and process bits at the same rate R. On the path from creation to processing at the receive end the transmit bits 1010 first arrive at a device that encapsulates them into packets and injects the transmit packets 1020 into a packet network 1024 at rate P. Just as the bits arrive from the application at regular intervals (line 1010 of FIG. 1B), the encapsulating device 1014 sends out packets at regular interval (line 1020 of FIG. 1B). However, the intervening packet network is not perfect, so it introduces PDV due to congestion.

In general, the mis-ordering of packets does not impair data applications. This is because the communications software associated with these applications will re-order the packets as needed. However, packet communications systems can also be used for transport of data from applications that are not so forgiving. The mis-ordering of packets impairs these applications. Examples include:

Leased line applications transported via circuit emulation
Video applications
Certain data protocols such as SNA The option exists for using software methods to correct the mis-ordering of packets but it may be impractical for certain applications. For example, a software-based approach requires large amounts of processor power, and may be impractical for high-bandwidth systems.

One prior art solution is disclosed in U.S. Pat. No. 6,134,246 for Inverse Multiplexing Within Asynchronous Transfer Mode Communication Networks. As described in connection with FIG. 11 of the '246 patent, the patent teaches the use of a circular buffer to be used for re-synchronizing the packets based on an applied sequence number. The circular queue increments the position of the read pointer (head of the circular queue) and maintains a state variable (R_Seq_N) that indicates the sequence number of the next packet that should be read at the head of the circular queue. Incoming packets with sequence numbers in the range R_Seq_N to R_Seq_N+buffer size are processed. Packets with sequence numbers less than R_Seq_N are discarded as too late. Although the text in column 21 suggests that really early packets are discarded, the pseudo code indicates that the system handles packets with sequence numbers greater than R_Seq_N+buffer size by sending this early packet and all stored packet to the application and then setting R_Seq_N to be one sequence number larger than this really early packet. The net result is that a packet with a sequence number that is beyond R_Seq_N+buffer number results in that really early packet being processed but leads to the discarding of packets that are not unusually early.

To illustrate this point, consider a case with a buffer of eight addresses:

At time 1 the buffer contains data associated with addresses 2, 3, 4, and 6. The value of R_Seq_N is 105.

| 0 | 1 | 2 (R_Seq_N = 105) | 3 | 4 | 5 | 6 | 7 |
|---|---|---|---|---|---|---|---|
|   |   | 105 | 106 | 107 |   | 109 |   |

At time 2, an incoming packet arrives with sequence number 115. The system reacts by providing the packets with sequence numbers 105, 106, 107, 109, and 115 to the output port all at once, rather than at an even cadence.

After time 2, R_Seq_N is set to 116. Thus, when packets with sequence numbers 108, 110, 111, 112, 113, and 114 arrive, they are discarded as "too late" since the next expected packet sequence number is 116.

The sequence number 510 used in the '246 patent is applied by the switching devices and is defined as a 32 bit integer. Thus, '246 patent does not teach how to modify the control logic to handle the situation when the sequence number exceeds the maximum sequence number and restarts (wraps) with 0. Wrapping is to be expected for all practical applications The method taught by the '246 patent does not include monitoring the position of the buffer tail and thus any use of the buffer depth in a control system would require a separate operation to determine the range of active buffer addresses. The method taught by the '246 patent is designed to ensure in-order packet delivery for non-time-critical packet traffic. Making the state machine synchronous with the incoming data is not a real drawback for this type of traffic, as it is bursty in nature and not time sensitive. The method of the '246 patent is not readily extended to applications that call for draining packets from the buffer at a constant rate. Nor does this method provide filler for missing packets.

Thus, prior art solutions do not provide an efficient, robust means to correct the order of mis-ordered packets.

It is therefore an object of the invention to provide for the efficient correction of packet mis-ordering using sequence numbers and a circular buffer.

It is another object of the invention to provide for the correction of mis-ordered packets to increase the robustness of the service to the end user without adding significantly to the need for processing power to support the application.

These and other advantages of the present invention are apparent from the drawings and the detailed description that follows.

BRIEF SUMMARY OF THE DISCLOSURE

A circular buffer is used to receive packets transmitted to an application. Normally, incoming packets are placed at the "tail" of the buffer, which is indicated by the write pointer. Packets to be used by the application are read from the "head" of the buffer, which is indicated by the read pointer. In contrast, the present invention uses the sequence number to direct the packets to specific places in the circular buffer. This inventive use of sequence number allows the packets to be written at the proper place in the buffer, regardless of the location of the write pointer. Within certain limits based on the size of the buffer, a packet that arrives out of sequence is not bound by the position of the write pointer to be placed into the buffer out of sequence.

DETAILED DESCRIPTION OF THE PREFERRED EMBODIMENT

The present invention will now be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
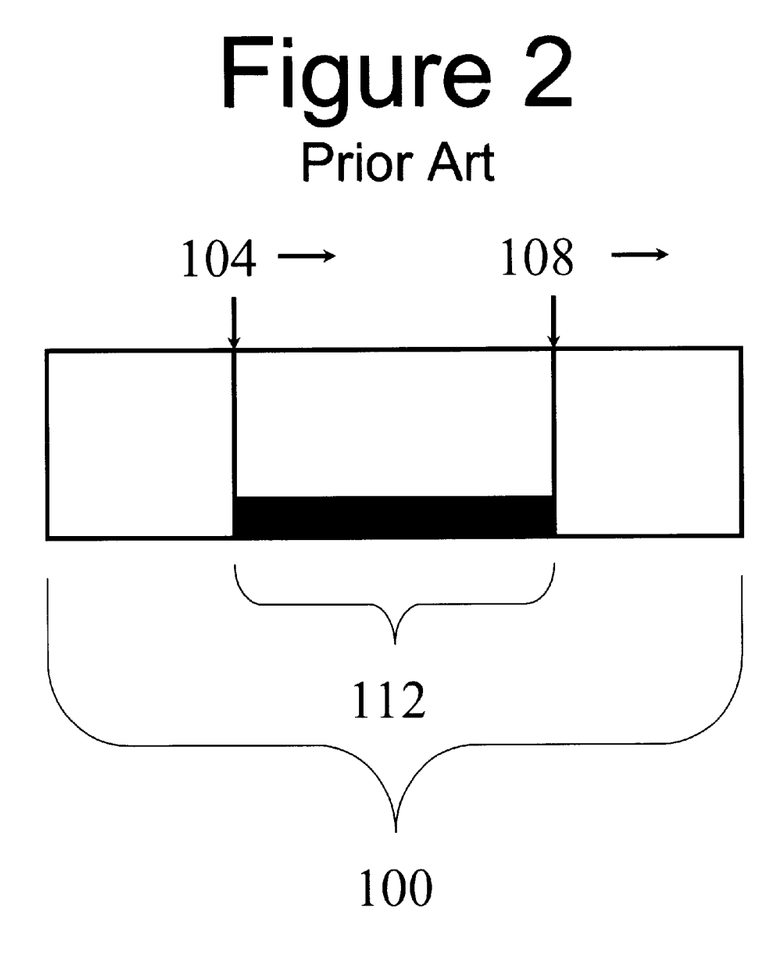
FIG. 2 illustrates a prior art circular buffer.
Figure 3:
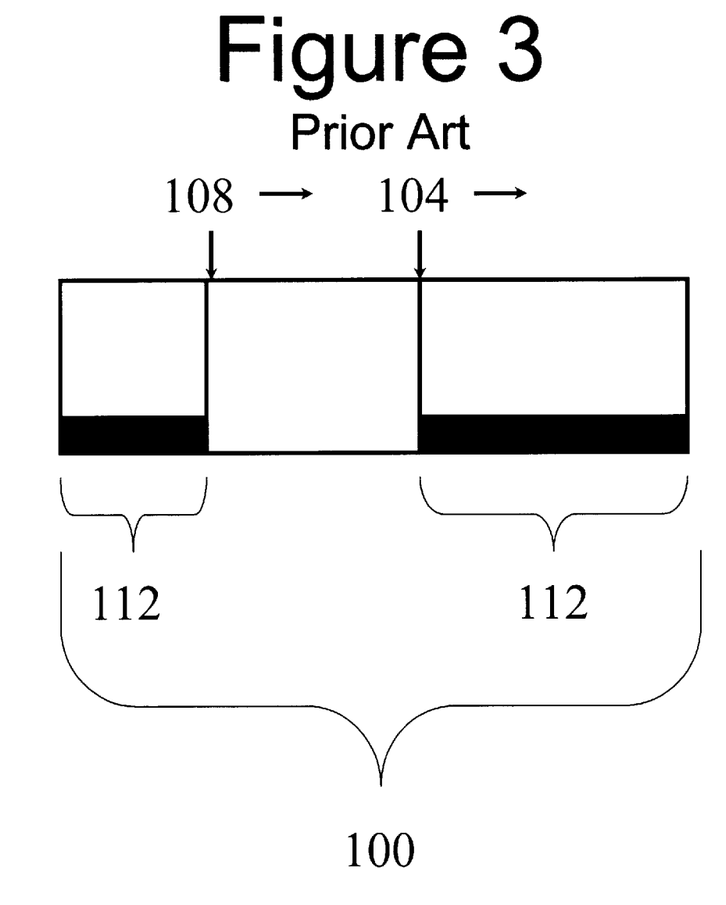
FIG. 3 illustrates a prior art circular buffer with the data wrapped around from the high addresses to the low addresses.

Use of a Circular Buffer to Correct Mis-Ordered Packets and to Minimize the Effects of Missing Packets Examples of prior circular buffers 100 are shown in FIGS. 2 and 3. In both of these figures the read pointer 104 and write pointer 108 are moving from left to right as time progresses.

The circular buffer 100 has a series of spaces (also known as "slots"). Each space is used to hold one packet between the time it is written into the space and the time it is read and removed from the space. Each space has an indicator that tells whether the space contains valid data. (Buffer spaces with valid data are shown in the Figures with a solid bar across the bottom of the buffer space.) The valid indication is set when a packet is written into a space and cleared when the read pointer 104 advances to a particular space.

Normally, incoming packets are placed at the "tail" of the buffer, which is indicated by the write pointer 108. They are read from the "head", which is indicated by the read pointer 104. Note that the buffer is circular and may wrap, as shown in FIG. 3. A wrapped buffer has the current address of the read pointer 104 with a larger address for the tail pointer 108 so that the busy space 112 appears to be in two pieces. Wrapping is a normal occurrence and does not in any way affect the data or the transported application.

The incoming packets contain a sequence number in order to allow for the correction of mis-ordered packets, using the application software as referenced above. In contrast to the prior art practice of placing packets into the buffer by order of arrival by incrementing the position of the write pointer 108, the present invention uses the sequence number to direct the packets to specific places in the circular buffer. This inventive use of sequence number allows the packets to be written at the proper place in the buffer, regardless of the location of the write pointer 108. This means that within limits, a packet that arrives out of packet number sequence can be placed into the circular buffer and read in appropriate packet order sequence.

Figure 4:
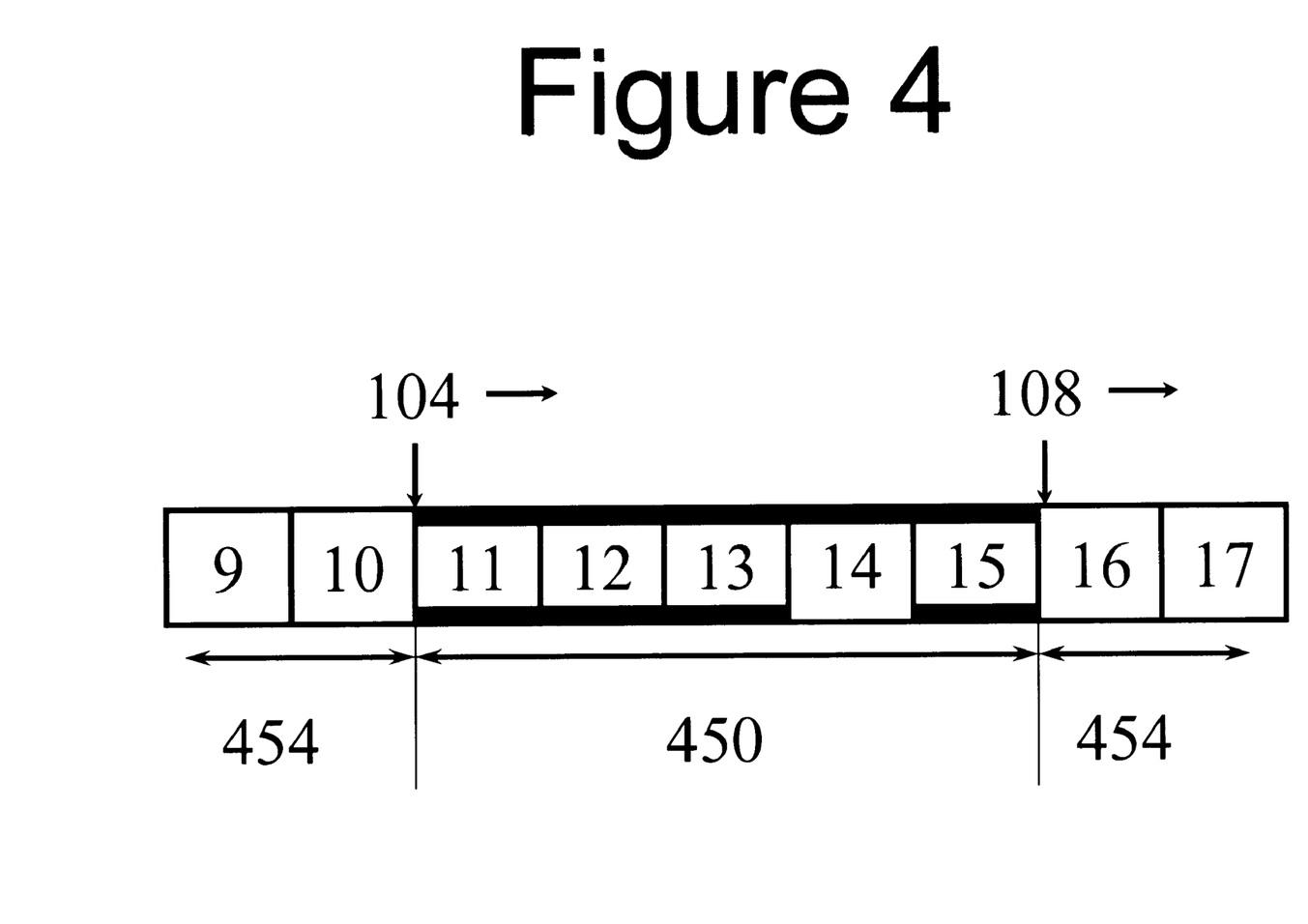
FIG. 4 illustrates a circular buffer operated in accordance with one embodiment of the present invention so that packets are placed according to packet sequence number rather than being sequentially placed based on order of arrival.

This use of sequence number to place packets within a circular buffer allows for a very simple and efficient correction of mis-ordered packets, as shown in generally in FIG. 4 and in detail in connection with the discussion of Table 1.

Example with Fixed-Size Packets

In FIG. 4, a packet arrived with sequence number 12 and was placed into a buffer address. When a packet arrived with sequence number 13 it was written to the buffer address adjacent to the address holding packet 12.

The next packet to arrive had a sequence number of 15 rather than 14 so a buffer address was skipped and packet 15 was placed two addresses away from packet 13 rather than next to packet 13.

With this sequence of events, a buffer address space is reserved for packet 14, as shown by its lack of stripes. Thus, the "Buffer used" 450 portion of the buffer 100 is the based on the distance between the head and tail but includes a slot reserved for an overdue packet. The rest of the buffer is considered "free" 454. Since this concept differs slightly from the notation used to show spaces with valid data, the buffer used section will be marked with a heavy bar at the top of the address space in the relevant figures. If packet 14 arrives before the read pointer advances to the reserved buffer address space, then packet 14 will be written into its reserved location and marked valid. If the read pointer advances to this location saved for packet 14 before the location is marked valid, then user-defined "filler" data will be sent to the user port, and packet 14 will be discarded if and when it arrives.

In addition to allowing for the correction of mis-ordered packets, this approach prevents a missing packet (or packets) from causing an underrun in the circular buffer. Consider the case where a buffer that is initially half full receives a sequence of packets where half were lost in transit. If the packets are being played out of the buffer at a fixed rate equal to the rate that the packets were transmitted, the buffer will be drained faster than it is being filled, and will eventually underrun. By reserving spaces for missing packets, the buffer will not underrun even in the presence of massive packet loss.

Another benefit is improved performance of adaptive timing recovery. Adaptive timing recovery is a means to reconstruct the transmit clock at the receiver based on the average arrival rate of the transmitted packets. The average depth of the buffer is monitored, and the draining clock is sped up as the buffer depth increases, and vice versa. If a packet is missing, then the clock will have to temporarily slow down to account for this, creating a short-term frequency error. This invention removes the effect of a missing packet on the re-creation of the transmit clock.

Leaving an empty space only speeds up the drain clock (the re-creation of the transmit clock) with respect to what it would have been without the empty space. In other words, leaving the empty space allows adaptive timing to operate correctly as described in this illustrative example:

The effect of lost packets on adaptive clocking can be described by the following equations:

Transmit Packet Rate=Transmit Bit Rate/Packet Size

Receive Bit Rate=Receive Packet Rate*Packet Size

If all packets get through, then

Receive Packet Rate=Transmit Packet Rate and

Receive Bit Rate=Receive Packet Rate*Packet Size

=Transmit Packet Rate*Packet Size

=(Transmit Bit Rate/Packet Size)*Packet Size

=Transmit Bit Rate

If half of the packets are lost, and no provision is made in the circular buffer, then Receive Bit Rate=Receive Packet Rate*Packet Size =½*Transmit Packet Rate*Packet Size =½*(Transmit Bit Rate/Packet Size)*Packet Size =½*Transmit Bit Rate Leaving a space for the missing packets removes the effect on the operation of adaptive clocking.

Example with Variable Sized Packets

Figure 5:
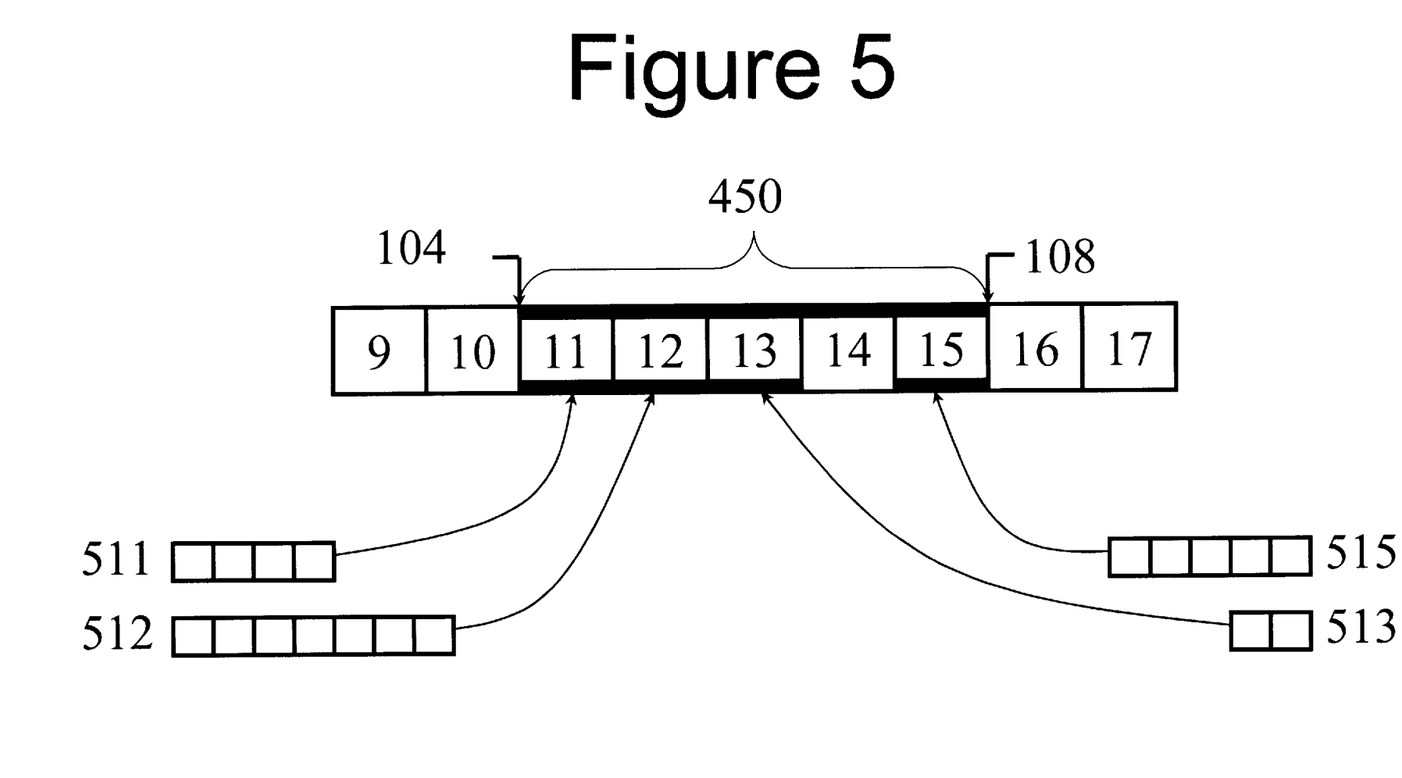
FIG. 5 illustrates another embodiment of the present invention where variable sized packets are placed inside the circular buffer slots.

Note that this approach may also be used for variable-sized packets. One method for variable-sized packet is shown in FIG. 5.

Here, the storage space for each buffer address (known as a "slot") is big enough to hold the biggest packet that will be received. In addition to the indication of whether the space contains data, it also contains an indication of how much data is there. Here are the utilizations of the spaces in FIG. 5:

Space 11 holds a packet 511 that is four units long

Space 12 holds a packet 512 that is seven units long which corresponds to the maximum size that can be stored in this fixed size slot.

Space 13 holds a small packet 513 that is two units long

Space 14 is empty

Space 15 holds a packet 515 that is five units long.

This method works well if the variation in packet size is small, or if the memory required to support a wide range is not impractical.

Figure 6:
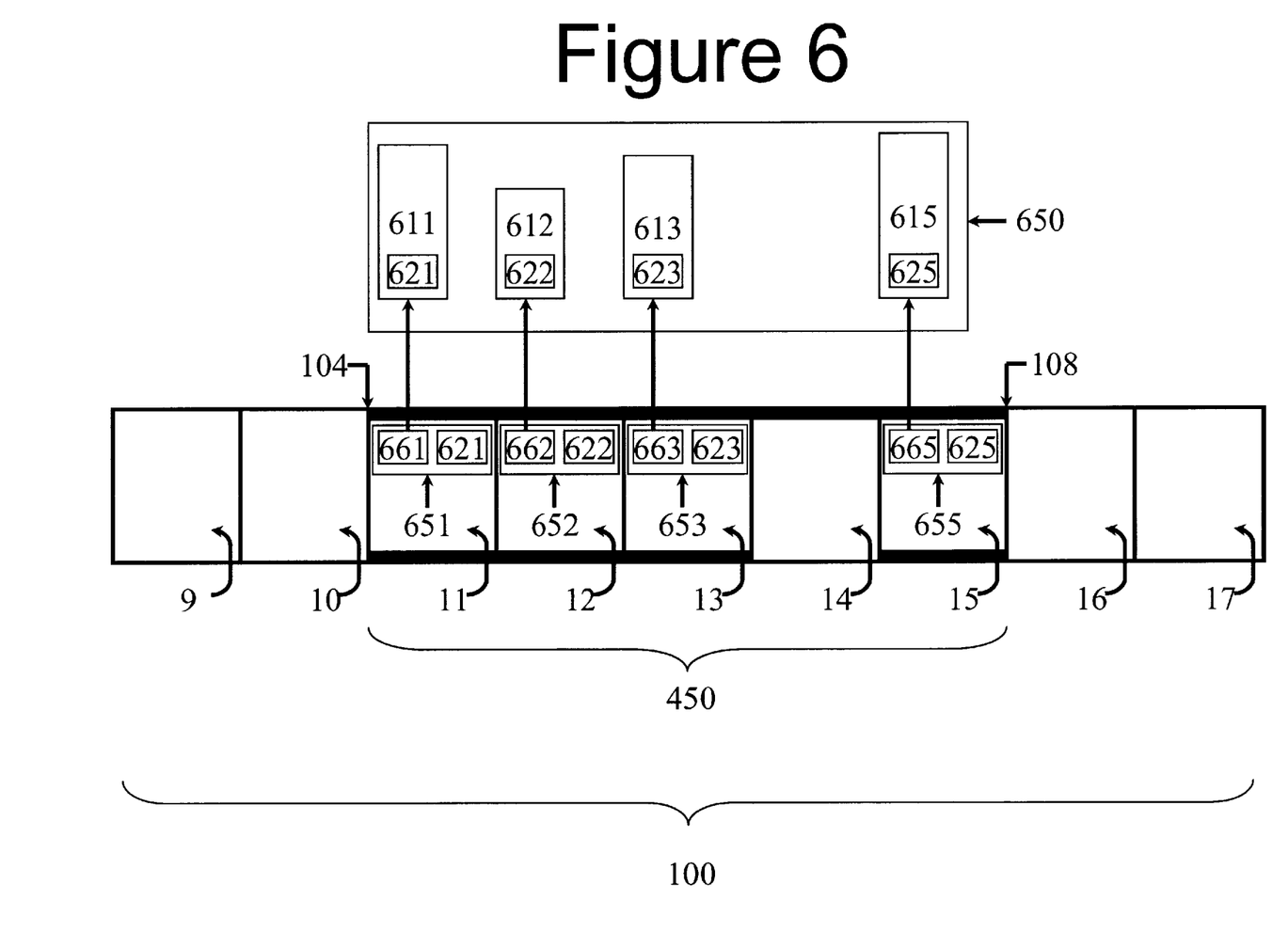
FIG. 6 illustrates another way to handle variable sized packets by storing a pointer to the actual stored packet.

Another approach is shown in FIG. 6. In this case, the circular buffer 100 stores a fixed size control block 651, 652, 653, and 655 that contains a pointer 661, 662, 663, and 665 to the actual packet 611, 612, 613, and 615 that is stored in other memory 650 and the sequence number 621, 622, 623, and 625 for the stored packet. This allows storage of variable sized packets 611, 612, 613, and 615 while minimizing the memory required in the circular buffer 100. For example, space 11 contains a pointer 661 to the stored packet 611 and contains a sequence number 621 for that packet, and space 12 contains a pointer 662 to stored packet 612 and contains a sequence number 622 for that packet.

More specifically, the incoming packet would be placed in temporary storage until it was determined that the sequence number was appropriate. At that point, a memory location external to the circular buffer would be selected to hold this packet. The control block 651, 652, 653, and 655 with the sequence number 621, 622, 623, and 625 and a pointer 661, 662, 663, and 665 to the external memory 650 location would be written to the appropriate circular buffer slot and the packet 611, 612, 613, and 615 would be written to the selected memory location.

Algorithm

The algorithm for determining the validity and buffer location for a packet is as follows:

{Calculate where the packet should be written}

Write Pointer Offset=(Current Sequence Number−Tail Sequence Number)

{See if the sequence number wrapped going from max back to 0}

If (Write Pointer Offset<0−Buffer Size)

Write Pointer Offset=Write Pointer Offset+Count of Sequence Numbers

[This adjusts for the discontinuity that would otherwise exist in the calculation of Write Pointer Offset when operating with sequence numbers on either side of the transition from 65535 to 0 for a Count of Sequence Numbers equal to 65536.]

{Correct Write Pointer Offset when going backwards across the sequence number wrap due an out-of-order delivery}

If (Write Pointer Offset>Buffer Size)

Write Pointer=Write Pointer−Count of Sequence Numbers

{See how many spaces are used and how many are available}

Buffer Spaces Used=(1+Tail Pointer−Current Read Pointer) modulus (Buffer Size)

Buffer Spaces Available=Buffer Size−Buffer Spaces Used

[These variables let you know how many spaces the write pointer can be moved without crossing over the current read pointer. This is useful in preventing the storing of a packet with an inappropriate sequence number.]

Figure 7:
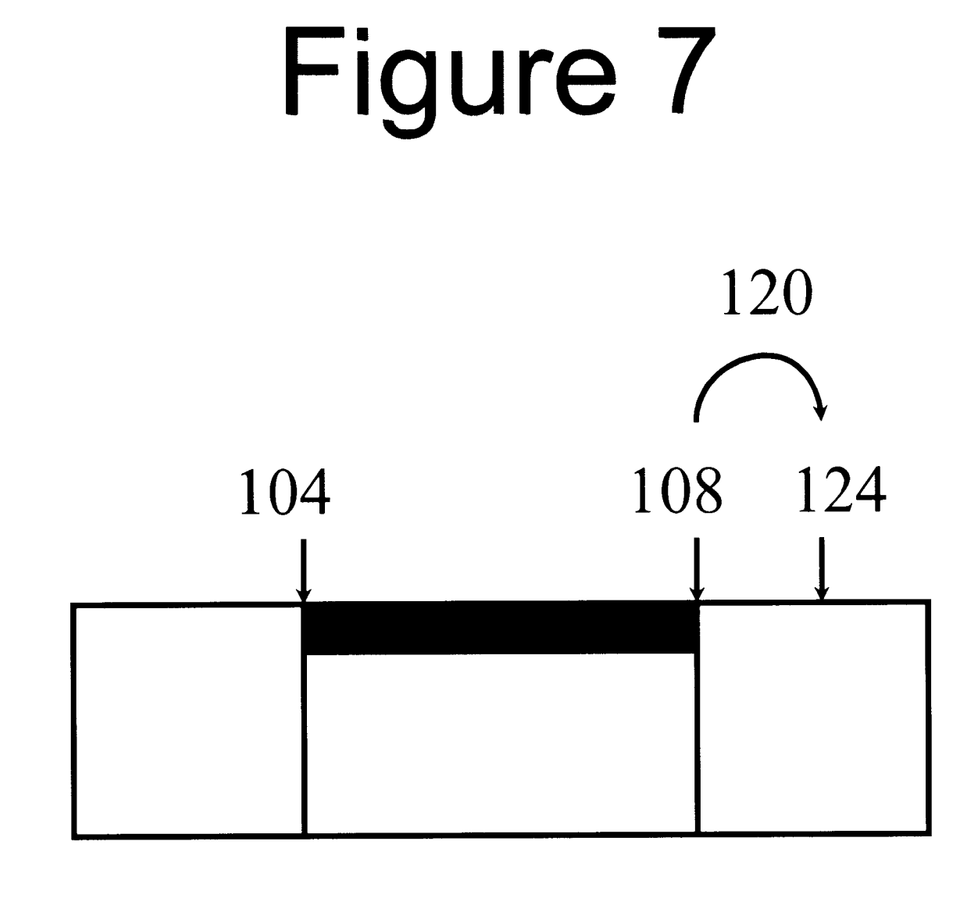
FIG. 7 illustrates the placement of the write pointer relative to the tail pointer without any wrapping.
Figure 8:
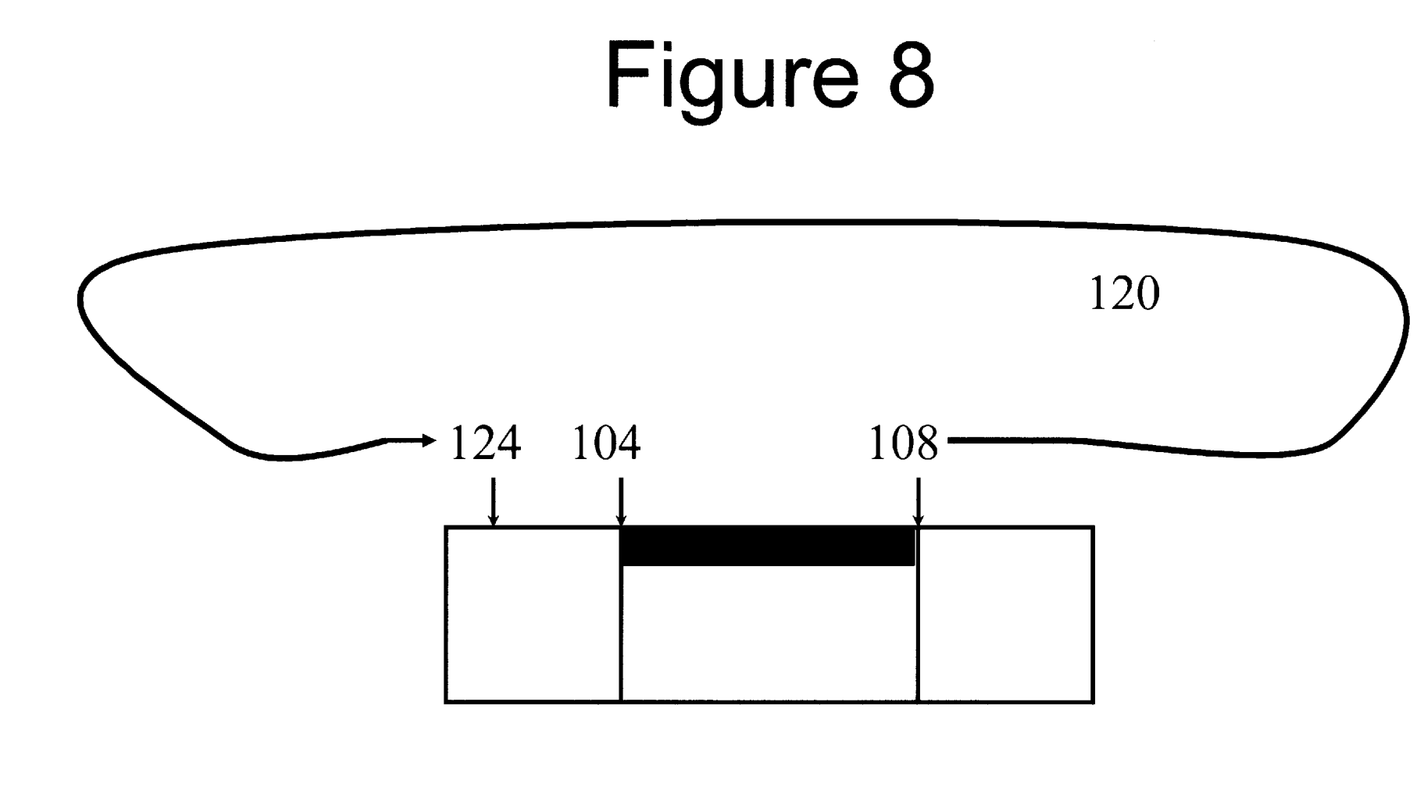
FIG. 8 illustrates the placement of the write pointer sufficiently beyond the tail pointer to wrap past the highest address in the circular buffer.
Figure 9:
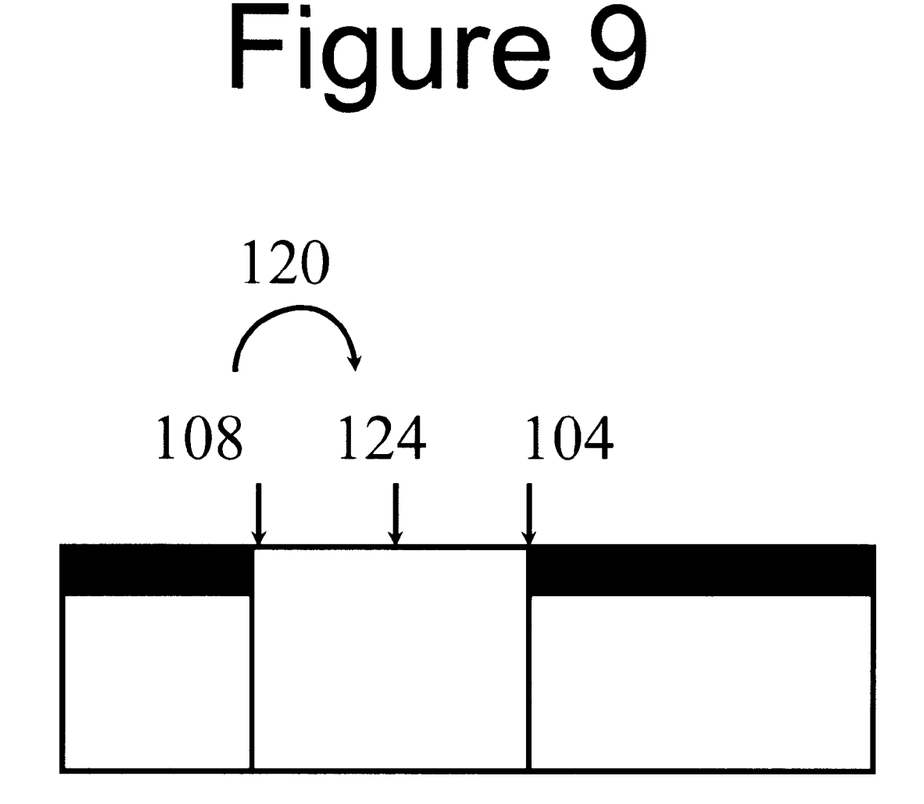
FIG. 9 illustrates the placement of the write pointer in unused buffer space when the circular buffer is wrapped.

{See if the packet is too early or out of range}
Rule 1: If (Write Pointer Offset>Buffer Spaces Available) Discard
{See if the packet is too late or out of range}
Rule 2: Else if (Write Pointer Offset<(1−Buffer Spaces Used)) Discard
Else {Packet is OK; write it out}
   New Write Pointer=(Tail Pointer+Write Pointer Offset) modulus (Buffer Size)
   Write the packet to space indicated by the New Write Pointer
   {See if the buffer got deeper, which means that we have a new tail}
   If (Current Read Pointer<Tail Pointer<New Write Pointer) {See FIG. 7}
   Or if (New Write Pointer<Current Read Pointer<Tail Pointer) {See FIG. 8}
   Or if (Tail Pointer<New Write Pointer<Current Read Pointer) {See FIG. 9}
      Tail Pointer=New Write Pointer
      Tail Sequence Number=Current Sequence Number The state variables, which must be remembered between each packet, are shown in bold above. These state variables are defined as follows:

Tail Sequence Number—This is the sequence number from the packet that was written to the tail.

Count of Sequence Numbers—the total number of sequence numbers. For a range of 0 to 65535 the count would be 65536.

Tail Pointer—a pointer to the highest location (taking wrapping into account) where a packet has been written. This packet has the highest sequence number (after taking sequence number wrapping into account) will be read later than any other packet currently in the buffer.

Buffer Size—the total number of circular buffer addresses

Current Read Pointer—the circular buffer address for the next packet that will be read from the buffer.

The temporary variables, which are computed anew for each packet, are:

Current Sequence Number—the sequence number read from the current packet

Write Pointer Offset (shown as movement arrow 120 in FIGS. 7–9)—this is so an offset in buffer addresses from the Tail Write Pointer 108 to the write location 124 for the current packet. This offset 120 may be positive or negative.

Buffer Used 450—this is a calculation of the amount of the circular buffer 100 that is occupied between the head and the tail. (Note as shown in FIG. 4, there may be some circular buffer spaces that are left empty awaiting late packets so Buffer Used may exceed the number of spaces holding packets.)

Buffer Spaces Available—this is a calculation of the amount of the circular buffer that is available for packets. (This calculation excludes the empty buffer spaces in the "Buffer Used" portion of the circular buffer)

New Write Pointer 124—this points to the write location for the current packet.

Note that the statement of the algorithm assumes that the packets are stored in the circular buffer. However, under one embodiment discussed above, the circular buffer stores a fixed size control block and the packet itself is written and retrieved from a location identified in the fixed size control block. To avoid undue clutter, the description of the algorithm did not repeatedly note that control blocks could be substituted for packets. The same algorithm would be used to store control blocks for an embodiment storing control blocks in the circular buffer.

Discussion of Table 1

An example of validation and re-ordering is shown in Table 1 located at the end of this specification and before the claims.

The following events in Table 1 are noteworthy:

Time index 4 shows a 16-bit sequence number wrapping from 65,535 to 0. This is a normal occurrence, and the packets are properly placed in adjacent spaces in the buffer.

Rule 1 is designed to catch packets that are too early. It is triggered at time index 9 for packet number 12.

Rule 2 is designed to catch packets that are too late. It is triggered at time index 33 for packet number 4.

Packet number 7 arrives out of order at time index 16. However, it is acceptable early and is written to Space 1, leaving spaces 14, 15 and 0 empty.

Packet number 5 arrives acceptably late at time index 17. The write pointer offset is −2, which is in range and valid. The packet is written to its proper location in space 15. Note that the Tail Pointer stays at 1 for packets 5 and 6.

When the read pointer advance to Space 4 at time index 29, there is no valid data present. Filler data is sent instead.

Those skilled in the art will recognize that the methods and apparatus of the present invention has many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

TABLE 1

| Time Index | Cur. Rd Ptr. | Cur. Seq. Num. | Tail Seq. Num. | Write Ptr. Offset | Buffer Spaces Used | Count of 1's | Buffer Spaces Avail | Seq. Num. Status | New Write Ptr. | Tail Ptr. |
|---|---|---|---|---|---|---|---|---|---|---|
| 0 | 15 | 65534 | 65533 | 1 | 8 | −54 | 8 | OK | 8 | 8 |
| 1 | 0 |  | 65534 | 1 | 9 | −44 | 7 | N/A | 8 | 8 |
| 2 | 0 | 65535 | 65534 | 1 | 9 | −45 | 7 | OK | 9 | 9 |

TABLE 1-continued

| | | | | | | | | | | |
|---|---|---|---|---|---|---|---|---|---|---|
| 3 | 1 | | 65535 | 1 | 9 | −36 | 7 | N/A | 9 | 9 |
| 4 | 1 | 0 | 65535 | 1 | 9 | −36 | 7 | OK | 10 | 10 |
| 5 | 2 | | 0 | 1 | 9 | −28 | 7 | N/A | 10 | 10 |
| 6 | 2 | 1 | 0 | 1 | 9 | −27 | 7 | OK | 11 | 11 |
| 7 | 3 | | 1 | 1 | 9 | −20 | 7 | N/A | 11 | 11 |
| 8 | 3 | 2 | 1 | 1 | 9 | −18 | 7 | OK | 12 | 12 |
| 9 | 4 | 12 | 2 | 10 | 9 | −12 | 7 | Early | 12 | 12 |
| 10 | 4 | 3 | 2 | 1 | 9 | −9 | 7 | OK | 13 | 13 |
| 11 | 5 | | 3 | 1 | 9 | −4 | 7 | N/A | 13 | 13 |
| 12 | 5 | | 3 | 1 | 9 | −4 | 7 | N/A | 13 | 13 |
| 13 | 6 | | 3 | 1 | 8 | 0 | 8 | N/A | 13 | 13 |
| 14 | 6 | | 3 | 1 | 8 | 0 | 8 | N/A | 13 | 13 |
| 15 | 7 | | 3 | 1 | 7 | 3 | 9 | N/A | 13 | 13 |
| 16 | 7 | 7 | 3 | 4 | 7 | 10 | 9 | OK | 1 | 1 |
| 17 | 8 | 5 | 7 | −2 | 10 | 17 | 6 | OK | 15 | 1 |
| 18 | 8 | | 7 | −2 | 10 | 17 | 6 | N/A | 15 | 1 |
| 19 | 9 | 6 | 7 | −1 | 9 | 24 | 7 | OK | 0 | 1 |
| 20 | 9 | | 7 | −1 | 9 | 24 | 7 | N/A | 0 | 1 |
| 21 | 10 | 8 | 7 | 1 | 8 | 32 | 8 | OK | 2 | 2 |
| 22 | 10 | 9 | 8 | 1 | 9 | 41 | 7 | OK | 3 | 3 |
| 23 | 11 | | 9 | 1 | 9 | 40 | 7 | N/A | 3 | 3 |
| 24 | 11 | 10 | 9 | 1 | 9 | 50 | 7 | OK | 4 | 4 |
| 25 | 12 | | 10 | 1 | 9 | 48 | 7 | N/A | 4 | 4 |
| 26 | 12 | 11 | 10 | 1 | 9 | 59 | 7 | OK | 5 | 5 |
| 27 | 13 | | 11 | 1 | 9 | 56 | 7 | N/A | 5 | 5 |
| 28 | 13 | | 11 | 1 | 9 | 56 | 7 | N/A | 5 | 5 |
| 29 | 14 | 12 | 11 | 1 | 8 | 68 | 8 | OK | 6 | 6 |
| 30 | 14 | 13 | 12 | 1 | 9 | 81 | 7 | OK | 7 | 7 |
| 31 | 15 | | 13 | 1 | 9 | 76 | 7 | N/A | 7 | 7 |
| 32 | 15 | | 13 | 1 | 9 | 76 | 7 | N/A | 7 | 7 |
| 33 | 0 | 4 | 13 | −9 | 8 | 70 | 8 | Late | 7 | 7 |
| 34 | 0 | 15 | 13 | 2 | 8 | 85 | 8 | OK | 9 | 9 |
| 35 | 1 | | 15 | 2 | 9 | 78 | 7 | N/A | 9 | 9 |

| Time | Buffer Status AFTER Write or Read | | | | | | | | | | | | | | | | Packet Read From Buffer | Notes |
|---|---|---|---|---|---|---|---|---|---|---|---|---|---|---|---|---|---|---|
| Index | 0 | 1 | 2 | 3 | 4 | 5 | 6 | 7 | 8 | 9 | 10 | 11 | 12 | 13 | 14 | 15 | | |
| 0 | −10 | −9 | −8 | −7 | −6 | −5 | −4 | −3 | −2 | | | | | | | | | #65534 (−2) arrives on time |
| 1 | | −9 | −8 | −7 | −6 | −5 | −4 | −3 | −2 | | | | | | | | #65526 (−10) | |
| 2 | | −9 | −8 | −7 | −6 | −5 | −4 | −3 | −2 | −1 | | | | | | | | #65535 (−1) arrives on time |
| 3 | | | −8 | −7 | −6 | −5 | −4 | −3 | −2 | −1 | | | | | | | #65527 (−9) | |
| 4 | | | −8 | −7 | −6 | −5 | −4 | −3 | −2 | −1 | 0 | | | | | | | #0 arrives on time |
| 5 | | | | −7 | −6 | −5 | −4 | −3 | −2 | −1 | 0 | | | | | | #65528 (−8) | |
| 6 | | | | −7 | −6 | −5 | −4 | −3 | −2 | −1 | 0 | 1 | | | | | | #1 arrives on time |
| 7 | | | | | −6 | −5 | −4 | −3 | −2 | −1 | 0 | 1 | | | | | #65529 (−7) | |
| 8 | | | | | | −6 | −5 | −4 | −3 | −2 | −1 | 0 | 1 | 2 | | | | #2 arrives on time |
| 9 | | | | | | | −5 | −4 | −3 | −2 | −1 | 0 | 1 | 2 | | | #65530 (−6) | #12 arrives too early; discard |
| 10 | | | | | | | −5 | −4 | −3 | −2 | −1 | 0 | 1 | 2 | 3 | | | #3 arrives on time |
| 11 | | | | | | | | −4 | −3 | −2 | −1 | 0 | 1 | 2 | 3 | | #65531 (−5) | |
| 12 | | | | | | | | −4 | −3 | −2 | −1 | 0 | 1 | 2 | 3 | | | |
| 13 | | | | | | | | | −3 | −2 | −1 | 0 | 1 | 2 | 3 | | #65532 (−4) | |
| 14 | | | | | | | | | −3 | −2 | −1 | 0 | 1 | 2 | 3 | | | |
| 15 | | | | | | | | | | −2 | −1 | 0 | 1 | 2 | 3 | | #65533 (−3) | |
| 16 | | 7 | | | | | | | | −2 | −1 | 0 | 1 | 2 | 3 | | | #7 arrives acceptably early |
| 17 | | 7 | 5 | | | | | | | | −1 | 0 | 1 | 2 | 3 | 5 | #65534 (−2) | #5 arrives acceptably late |
| 18 | | 7 | | | | | | | | | −1 | 0 | 1 | 2 | 3 | 5 | | |
| 19 | 6 | 7 | | | | | | | | | | 0 | 1 | 2 | 3 | 5 | #65535 (−1) | #6 arrives acceptably late |
| 20 | 6 | 7 | | | | | | | | | | 0 | 1 | 2 | 3 | 5 | | |
| 21 | 6 | 7 | 8 | | | | | | | | | | 1 | 2 | 3 | 5 | #0 | #8 arrives acceptably late |
| 22 | 6 | 7 | 8 | 9 | | | | | | | | | 1 | 2 | 3 | 5 | | #9 arrives on time |
| 23 | 6 | 7 | 8 | 9 | | | | | | | | | | 2 | 3 | 5 | #1 | |
| 24 | 6 | 7 | 8 | 9 | 10 | | | | | | | | | 2 | 3 | 5 | | #10 arrives on time |
| 25 | 6 | 7 | 8 | 9 | 10 | | | | | | | | | | 3 | 5 | #2 | |
| 26 | 6 | 7 | 8 | 9 | 10 | 11 | | | | | | | | | 3 | 5 | | #11 arrives on time |
| 27 | 6 | 7 | 8 | 9 | 10 | 11 | | | | | | | | | | 5 | #3 | |
| 28 | 6 | 7 | 8 | 9 | 10 | 11 | | | | | | | | | | 5 | | |
| 29 | 6 | 7 | 8 | 9 | 10 | 11 | 12 | | | | | | | | | 5 | filler | #12 arrives acceptably late |
| 30 | 6 | 7 | 8 | 9 | 10 | 11 | 12 | 13 | | | | | | | | 5 | | #13 arrives on time |
| 31 | 6 | 7 | 8 | 9 | 10 | 11 | 12 | 13 | | | | | | | | | #5 | |
| 32 | 6 | 7 | 8 | 9 | 10 | 11 | 12 | 13 | | | | | | | | | | |
| 33 | | 7 | 8 | 9 | 10 | 11 | 12 | 13 | | | | | | | | | #6 | #4 arrives too late; discard |
| 34 | | 7 | 8 | 9 | 10 | 11 | 12 | 13 | | 15 | | | | | | | | #15 arrives on time |
| 35 | | | 8 | 9 | 10 | 11 | 12 | 13 | | 15 | | | | | | | #7 | |

What is claimed is:

1. A method of placing an incoming packet into a circular buffer based on a sequence number for the incoming packet, the method comprising:

calculating a write pointer offset based on the sequence number of the incoming packet and a sequence number of a packet currently associated with a buffer tail pointer for the circular buffer; and discarding a too-early incoming packet with a sequence number of at least a sum of a sequence number associated with a packet to be read in the next read operation for the circular buffer plus a total number of addresses for the circular buffer, after adjusting for wrapping of sequence numbers.

2. A method of placing an incoming packet into a circular buffer based on a sequence number for the incoming packet, the method comprising:

calculating a write pointer offset based on the sequence number of the incoming packet and a sequence number of a packet currently associated with a buffer tail pointer for the circular buffer and;

storing a mildly-early incoming packet with a sequence number less than a sum of a sequence number of a next packet to be read in the next read operation plus a total number of addresses for the circular buffer, after adjusting for wrapping of sequence numbers, then storing a timely incoming packet with a sequence number less than the sequence number of the mildly-early incoming packet, after adjusting for wrapping of sequence numbers.

3. A method of storing an incoming packet and placing a control block into a circular buffer based on a sequence number for the incoming packet, the method comprising:

calculating a write pointer offset based on the sequence number of the incoming packet and a sequence number of a packet currently associated with a buffer tail pointer for the circular buffer, writing the control block containing both the sequence number for the incoming packet and a pointer to a memory storage location, the control block written into the circular buffer based on the write pointer offset;

storing the incoming packet in the memory storage location corresponding to the pointer in the control block; and discarding a too-early incoming packet with a sequence number of at least a sum of a sequence number associated with a packet to be read in the next read operation plus a total number of addresses for the circular buffer, after adjusting for wrapping of sequence numbers.

4. A method of storing an incoming packet and placing a control block into a circular buffer based on a sequence number for the incoming packet, the method comprising:

calculating a write pointer offset based on the sequence number of the incoming packet and a sequence number of a packet currently associated with a buffer tail pointer for the circular buffer, writing the control block containing both the sequence number for the incoming packet and a pointer to a memory storage location, the control block written into the circular buffer based on the write pointer offset;

storing the incoming packet in the memory storage location corresponding to the pointer in the control block and;

storing a mildly-early incoming packet with a sequence number less than a sum of a sequence number of a next packet to be read in the next read operation plus a total number of addresses for the circular buffer, after adjusting for wrapping of sequence numbers, then storing a timely incoming packet with a sequence number less than the sequence number of the mildly-early incoming packet, after adjusting for wrapping of sequence numbers.

5. A method of placing an incoming packet into a circular buffer based on a sequence number of the incoming packet, the method comprising:

A) storing the following state variables:
   Count of Sequence Numbers;
   Tail Pointer wherein the Tail Pointer is a pointer to a highest circular buffer slot where an unread packet is stored, taking wrapping of circular buffer slots into account;
   Tail Sequence Number wherein the Tail Sequence Number is a sequence number for the unread packet in the circular buffer slot corresponding to the Tail Pointer;
   Buffer Size wherein the Buffer Size is a total number of slots for the circular buffer; and
   Current Read Pointer wherein the Current Read Pointer is the circular buffer slot for a next packet that will be read from the circular buffer;

B) receiving the incoming packet;

C) setting the Current Sequence Number equal to a sequence number for the incoming packet;

D) setting a Write Pointer Offset=(Current Sequence Number−Tail Sequence Number);

E) adjusting Write Pointer Offset for sequence number wrapping:
   IF (Write Pointer Offset<0−Buffer Size)
   THEN
      Write Pointer Offset=Write Pointer Offset+Count of Sequence Numbers;

F) adjusting Write Point Offset for going backwards across the sequence number wrap due to an out-of-order delivery:
   IF (Write Pointer Offset>Buffer Size)
   THEN
      Write Pointer=Write Pointer−Count of Sequence Numbers;

G) setting Buffer Spaces Used=(1+Tail Pointer−Current Read Pointer) modulus (Buffer Size);

H) setting Buffer Spaces Available=Buffer Size−Buffer Spaces Used

I) writing in-range packet:
   IF (Write Pointer Offset>Buffer Spaces Available)
   THEN Discard
   ELSE
      IF (Write Pointer Offset<(1−Buffer Spaces Used))
      THEN Discard
      ELSE
      New Write Pointer=(Tail Pointer+Write Pointer Offset) modulus (Buffer Size); and
      Write the incoming packet to a circular buffer slot indicated by the New Write Pointer; and J) check for new buffer tail:
   IF (Current Read Pointer<Tail Pointer<New Write Pointer) OR
   IF (New Write Pointer<Current Read Pointer<Tail Pointer) OR
   IF (Tail Pointer<New Write Pointer<Current Read Pointer)
   THEN
      Tail Pointer=New Write Pointer; and
      Tail Sequence Number=Current Sequence Number.

6. A method of storing an incoming packet that includes storing a control block comprising: a) a pointer to a stored packet; and b) a sequence number for the stored packet, the method including a step of determining a next circular buffer slot in a circular buffer to receive the control block related to the incoming packet, the determination based on a sequence number of the incoming packet, the step of determining the next circular buffer slot comprising:

A) storing the following state variables:
  Count of Sequence Numbers;
  Tail Pointer wherein the Tail Pointer is a pointer to a highest circular buffer slot where a control block is stored, taking wrapping of circular buffer slots into account;
  Tail Sequence Number wherein the Tail Sequence Number is a sequence number for the control block in the circular buffer slot corresponding to the Tail Pointer;
  Buffer Size wherein the Buffer Size is a total number of slots for the circular buffer; and
  Current Read Pointer wherein the Current Read Pointer is the circular buffer slot for a next control block that will be read from the circular buffer to trigger the reading of the stored packet associated with the control block;
B) receiving the incoming packet;
C) setting a Current Sequence Number equal to the sequence number for the current incoming packet;
D) setting a Write Pointer Offset=(Current Sequence Number−Tail Sequence Number);
E) adjusting Write Pointer Offset for sequence number wrapping:
  IF (Write Pointer Offset<0−Buffer Size)
  THEN
    Write Pointer Offset=Write Pointer Offset+Count of Sequence Numbers;
F) adjusting Write Point Offset for going backwards across the sequence number wrap due to an out-of-order delivery:
  IF (Write Pointer Offset>Buffer Size)
  THEN
    Write Pointer=Write Pointer−Count of Sequence Numbers;
G) setting Buffer Spaces Used=(1+Tail Pointer−Current Read Pointer) modulus (Buffer Size);
H) setting Buffer Spaces Available=Buffer Size−Buffer Spaces Used
I) writing the control block for an in-range packet:
  IF (Write Pointer Offset>Buffer Spaces Available)
  THEN discard incoming packet
  ELSE
    IF (Write Pointer Offset<(1−Buffer Spaces Used))
    THEN discard incoming packet
    ELSE
      New Write Pointer=(Tail Pointer+Write Pointer Offset) modulus (Buffer Size); and
      Write the control block for the incoming packet to circular buffer address indicated by the New Write Pointer; and
J) check for new buffer tail:
  IF (Current Read Pointer<Tail Pointer<New Write Pointer) OR
  IF (New Write Pointer<Current Read Pointer<Tail Pointer) OR
  IF (Tail Pointer<New Write Pointer<Current Read Pointer)
  THEN
    Tail Pointer=New Write Pointer; and
    Tail Sequence Number=Current Sequence Number.

7. A method of placing an incoming packet into a circular buffer based on a sequence number for the incoming packet, the method comprising:

calculating a write pointer offset based on the sequence number of the incoming packet and a sequence number of a packet currently associated with a buffer tail pointer for the circular buffer;

discarding a too-early incoming packet with a sequence number of at least a sum of a sequence number associated with a packet to be read in the next read operation for the circular buffer plus a total number of addresses for the circular buffer after adjusting for wrapping of sequence numbers;

storing a mildly-early incoming packet with a sequence number less than a sum of a sequence number of a packet to be read in the next read operation plus a total number of addresses for the circular buffer, after adjusting for wrapping of sequence sequence numbers; and then storing a timely incoming packet with a sequence number less than the sequence number of the mildly-early incoming packet, after adjusting for wrapping of sequence numbers.

8. A method of storing an incoming packet and placing a control block into a circular buffer based on a sequence number for the incoming packet, the method comprising:

calculating a write pointer offset based on the sequence number of the incoming packet and a sequence number of a packet currently associated with a buffer tail pointer for the circular buffer;

IF the sequence number for the incoming packet is less than a sum of a sequence number of a packet to be read in the next read operation plus a total number of addresses for the circular buffer, after adjusting for wrapping of sequence numbers;

THEN
  writing the control block containing both a) the sequence number for the incoming packet and b) a pointer to a memory storage location, the control block written into a circular buffer slot based on the write pointer offset; and
  storing the incoming packet in the memory storage location corresponding to the pointer in the control block;
ELSE
  discarding the incoming packet.

9. A method of storing an incoming packet and placing a control block into a circular buffer based on a sequence number for the incoming packet, the method comprising:

calculating a write pointer offset based on the sequence number of the incoming packet and a sequence number of a packet currently associated with a buffer tail pointer for the circular buffer;

IF the sequence number for the incoming packet is less than a sum of a sequence number of a packet to be read in the next read operation plus a total number of addresses for the circular buffer, after adjusting for wrapping of sequence numbers;

THEN
  storing the incoming packet in a memory storage location; and
  writing the control block containing both a) the sequence number for the stored incoming packet and b) a pointer to the memory storage location, the control block written into a circular buffer slot based on the write pointer offset;
ELSE
  discarding the incoming packet.

* * * * *